(12) United States Patent
Park et al.

(10) Patent No.: US 10,539,717 B2
(45) Date of Patent: Jan. 21, 2020

(54) POLARIZING PLATES AND OPTICAL DISPLAY APPARATUSES INCLUDING THE POLARIZING PLATES

(71) Applicant: CHEIL INDUSTRIES INC., Gumi-si, Gyeongsangbuk-do (KR)

(72) Inventors: Eun Su Park, Uiwang-si (KR); Dong Yoon Shin, Uiwang-si (KR); Pil Joo Kim, Uiwang-si (KR); Kwang Ho Shin, Uiwang-si (KR); Hae Ryong Chung, Uiwang-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 165 days.

(21) Appl. No.: 14/135,395

(22) Filed: Dec. 19, 2013

(65) Prior Publication Data

US 2014/0178706 A1 Jun. 26, 2014

(30) Foreign Application Priority Data

Dec. 20, 2012 (KR) .................. 10-2012-0150056
Dec. 16, 2013 (KR) .................. 10-2013-0156632
Dec. 18, 2013 (KR) .................. 10-2013-0157976

(51) Int. Cl.
*G02B 1/14* (2015.01)
*G02B 1/10* (2015.01)
(Continued)

(52) U.S. Cl.
CPC .............. *G02B 1/14* (2015.01); *G02B 1/105* (2013.01); *B32B 27/06* (2013.01); *B32B 27/08* (2013.01);
(Continued)

(58) Field of Classification Search
None
See application file for complete search history.

(56) References Cited

U.S. PATENT DOCUMENTS 4,388,375 A * 6/1983 Hopper .................. B32B 27/08
428/423.7
4,586,790 A * 5/1986 Umeda ............. G02F 1/133305
349/102
(Continued)

FOREIGN PATENT DOCUMENTS

CN 1755406 A 4/2006
CN 1791817 A 6/2006
(Continued)

OTHER PUBLICATIONS

Free Dictionary—"Diagonal". (http://www.thefreedictionary.com/diagonal) (webpage retrieved Apr. 18, 2016).*
(Continued)

*Primary Examiner* — Vivian Chen
(74) *Attorney, Agent, or Firm* — Lewis Roca Rothgerber Christie LLP

(57) ABSTRACT

A polarizing plate comprises a polarizer; and at least one optical film on at least one side of the polarizer, wherein the optical film comprises a polyester film, the polyester film has a shrinkage difference between a length shrinkage in a first diagonal direction and a length shrinkage in a second diagonal direction of −0.1% to +0.1% with respect to either the mechanical direction (MD) or the transverse direction (TD) of the polyester film (as a reference direction). An optical display apparatus includes the polarizing plate.

5 Claims, 3 Drawing Sheets

(51) Int. Cl.

| | | |
|---|---|---|
| *B32B 27/06* | (2006.01) | |
| *B32B 27/08* | (2006.01) | |
| *B32B 27/36* | (2006.01) | |
| *G02B 5/30* | (2006.01) | |
| *G02B 27/28* | (2006.01) | |
| *G02B 1/04* | (2006.01) | |
| *G02B 1/08* | (2006.01) | |
| *G02F 1/1335* | (2006.01) | |
| *G02F 1/13363* | (2006.01) | |
| *G02F 1/13* | (2006.01) | |

(52) U.S. Cl.
CPC ........... *B32B 27/36* (2013.01); *B32B 2307/40* (2013.01); *B32B 2307/42* (2013.01); *B32B 2307/516* (2013.01); *B32B 2307/732* (2013.01); *B32B 2307/734* (2013.01); *B32B 2367/00* (2013.01); *B32B 2551/00* (2013.01); *G02B 1/04* (2013.01); *G02B 1/08* (2013.01); *G02B 5/30* (2013.01); *G02B 5/3025* (2013.01); *G02B 5/3033* (2013.01); *G02B 5/3083* (2013.01); *G02B 27/28* (2013.01); *G02F 1/13* (2013.01); *G02F 1/1335* (2013.01); *G02F 1/13363* (2013.01); *G02F 1/133528* (2013.01); *G02F 2001/133638* (2013.01); *G02F 2202/40* (2013.01); *Y10T 428/31786* (2015.04)

(56) References Cited

U.S. PATENT DOCUMENTS

| | | | | |
|---|---|---|---|---|
| 4,592,623 A * | 6/1986 | Yamamoto | ........... | G02B 5/3033 349/122 |
| 4,756,953 A * | 7/1988 | Utsumi | ................ | G02B 1/08 428/220 |
| 4,799,772 A * | 1/1989 | Utsumi | .................. | C08J 5/18 349/158 |
| 5,056,896 A * | 10/1991 | Iimura | ................ | G02F 1/13363 349/101 |
| 5,061,042 A * | 10/1991 | Nakamura | ........... | G02B 5/3083 349/102 |
| 5,145,746 A * | 9/1992 | Tomoyuki | ............... | B32B 17/10 428/432 |
| 5,759,467 A * | 6/1998 | Carter | .................. | B29C 55/023 264/173.12 |
| 5,965,247 A * | 10/1999 | Jonza | .................... | B29C 55/023 264/173.11 |
| 6,001,489 A * | 12/1999 | Miyaake | ................. | B32B 15/08 174/254 |
| 6,111,697 A * | 8/2000 | Merrill | ................. | G02B 5/3041 359/487.02 |
| 6,113,811 A * | 9/2000 | Kausch | ..................... | C08J 5/18 252/585 |
| 9,405,048 B2 * | 8/2016 | Oya | ..................... | G02B 5/305 |
| 2002/0180107 A1 * | 12/2002 | Jackson | ................ | B29C 55/08 264/288.4 |
| 2003/0016334 A1 * | 1/2003 | Weber | ................. | G02B 27/283 353/20 |
| 2004/0189907 A1 * | 9/2004 | Tominaga | ......... | G02F 1/133528 349/115 |
| 2005/0024558 A1 * | 2/2005 | Toyooka | .............. | G02B 6/0056 349/112 |
| 2005/0260384 A1 * | 11/2005 | Ouderkirk | ................ | B32B 7/02 428/137 |
| 2006/0072057 A1 | 4/2006 | Yano et al. | | |
| 2006/0226561 A1 * | 10/2006 | Merrill | ................... | B29C 55/08 264/1.34 |
| 2006/0275559 A1 | 12/2006 | Ishibashi et al. | | |
| 2008/0233312 A1 * | 9/2008 | Nakamura | ............ | G02B 1/105 428/1.31 |
| 2009/0128737 A1 * | 5/2009 | Ouderkirk | .............. | G02B 5/305 349/64 |
| 2009/0231520 A1 * | 9/2009 | Uchiyama | ........... | G02B 5/3016 349/96 |
| 2011/0103036 A1 * | 5/2011 | Bosl | ..................... | G02B 5/3033 362/19 |
| 2011/0162198 A1 * | 7/2011 | Kawamoto | ......... | H01M 4/0433 29/623.1 |
| 2012/0069272 A1 * | 3/2012 | Sugita | .................. | G02B 5/0257 349/64 |
| 2012/0249935 A1 * | 10/2012 | Oya | ........................ | B32B 27/08 349/96 |
| 2013/0100378 A1 * | 4/2013 | Murata | .............. | G02F 1/133528 349/61 |
| 2013/0194211 A1 * | 8/2013 | Shinohara | .............. | G02B 1/115 345/173 |
| 2013/0279155 A1 * | 10/2013 | Kuroda | .................... | G02B 1/11 362/97.4 |
| 2014/0053901 A1 * | 2/2014 | Brennan | .................... | C08J 5/18 136/259 |
| 2014/0089325 A1 * | 3/2014 | Jones | ..................... | G06F 16/335 707/748 |

FOREIGN PATENT DOCUMENTS

| | | | |
|---|---|---|---|
| CN | 102186923 A | | 9/2011 |
| JP | 58-187914 A | * | 11/1983 |
| JP | 59-052217 A | * | 3/1984 |
| JP | 2001-072780 A | * | 3/2001 |
| JP | 2005-186555 | * | 7/2005 |
| JP | 2008-268668 A | * | 11/2008 |
| JP | 2010-253831 | * | 11/2010 |
| JP | 2010-253831 A | | 11/2010 |
| JP | 2010-277028 A | * | 12/2010 |
| JP | 2011-059488 A | * | 3/2011 |
| JP | 2011-59488 A | | 3/2011 |
| JP | 2011-148201 | * | 8/2011 |
| JP | 2011-148202 A | * | 8/2011 |
| JP | 5051328 B | * | 10/2012 |
| KR | 10-2006-0101593 A | * | 9/2006 |
| KR | 10-2008-0043309 A | | 5/2008 |
| KR | 10-2010-0024304 A | | 3/2010 |
| TW | 201041731 A1 | | 12/2010 |
| TW | 201245296 A1 | | 11/2012 |
| WO | WO 2011/162198 A | * | 12/2011 |
| WO | WO 2011/162198 A1 | | 12/2011 |
| WO | WO 2012/096088 A1 | | 7/2012 |
| WO | WO 2012/157663 A | * | 11/2012 |

OTHER PUBLICATIONS

Free Dictionary—"Oblique". (http://www.thefreedictionary.com/oblique) (webpage retrieved Apr. 18, 2016).*
Taiwan Patent Office action dated Jul. 6, 2015 issued in corresponding Application No. 102147161, with partial English translation, 5 pages.
SIPO Office action dated Aug. 4, 2015 in corresponding CN Application No. 201310713119.9, 6 pages.
Korean Patent Office action dated Mar. 21, 2016, issued in KR Application No. 10-2013-0157976, with English translation, 8 pages.
Korean Office action dated Apr. 28, 2017, corresponding to Korean Patent Application No. 10-2013-0157976 (4 pages).
Korean Office Action dated Nov. 30, 2017, for corresponding Korean Patent Application No. 10-2013-0157976 (4 pages).

* cited by examiner

POLARIZING PLATES AND OPTICAL DISPLAY APPARATUSES INCLUDING THE POLARIZING PLATES

CROSS-REFERENCE TO RELATED APPLICATION

This application claims priority to and the benefit of Korean Patent Application No. 10-2012-0150056, filed on Dec. 20, 2012 in the Korean Intellectual Property Office, Korean Patent Application No. 10-2013-0156632, filed on Dec. 16, 2013 in the Korean Intellectual Property Office, and Korean Patent Application No. 10-2013-0157976, filed on Dec. 18, 2013 in the Korean Intellectual Property Office, the entire contents of all of which are incorporated herein by reference.

BACKGROUND

1. Technical Field

The present invention relates to a polarizing plate and an optical display apparatus including the same.

2. Description of the Related Art

A polarizing plate generally includes a polarizer having a polarizing function, and a protective film attached to one or both sides of the polarizer to protect the polarizer. According to the type of optical display apparatus to which the polarizing plate is mounted, a retardation compensation film, a bonding layer, an adhesive layer, a surface treatment layer, or the like may be additionally stacked on the protective film of the polarizing plate. The protective film may serve to provide retardation and optic axis correction in addition to providing polarizer protection.

As a protective film for a polarizing plate, triacetyl cellulose (TAC) films have been used. Since TAC films have high glass transition temperatures (Tg) and are manufactured by casting, the films exhibit stable length shrinkage in a mechanical direction (MD) or transverse direction (TD). Further, the TAC films are manufactured without a stretching process, and thus exhibit no heat shrinkage.

Recently, polyethylene terephthalate (PET) films have been used in an effort to diversify protective films for polarizers. Substitute films, such as PET and the like, are stretched films and have relatively high MD or TD elongation. On this account, PET films may exhibit thermal shrinkage and expansion behavior. Further, PET films have lower glass transition temperatures than TAC films, and thus may exhibit thermal shrinkage, which in turn causes distortion of the optical axis of a polarizer during manufacture of the polarizing plate, thereby lowering the degree of polarization.

For this reason, technologies have been developed to control the MD or TD shrinkage of PET films. Although the basic physical properties or bending properties of the films can be controlled by controlling MD or TD shrinkage, such control is represented by shrinkage in the mechanical/transverse directions, and does not prevent optical axis distortion occurring during manufacture or driving of the polarizing plate.

SUMMARY

According to some embodiments of the present invention, a polarizing plate comprises a polarizer; and at least one optical film on at least one side of the polarizer; wherein the optical film comprises a polyester film, the polyester film has a shrinkage difference between a length shrinkage in a first diagonal direction and a length shrinkage in a second diagonal direction of about −0.1% to about +0.1% with respect to either the mechanical direction (MD) or the transverse direction (TD) of the polyester film (as a reference direction).

The length shrinkage in the first diagonal direction may be represented by Equation 1:

$$\text{Length shrinkage in the first diagonal direction}(\%) = (A-B)/A \times 100 \qquad \text{Equation 1}$$

In Equation 1, A is an initial length of a specimen of the polyester film corresponding to the first diagonal direction with respect to the reference direction. B is a length of the specimen of the polyester film corresponding to the first diagonal direction after allowing the specimen to stand at 85±5° C. for 30 minutes.

The length shrinkage in the second diagonal direction may be represented by Equation 2:

$$\text{Length shrinkage in the second diagonal direction}(\%) = (C-D)/C \times 100, \qquad \text{Equation 2}$$

In Equation 2, C is an initial length of a specimen of the polyester film corresponding to the second diagonal direction with respect to the reference direction. D is a length of the specimen of the polyester film specimen corresponding to the second diagonal direction after allowing the specimen to stand at 85±5° C. for 30 minutes.

Here, an angle between the first diagonal direction and the second diagonal direction is not 0°.

An angle between the first diagonal direction and the reference direction may be about 30° to about 60°, and an angle between the second diagonal direction and the reference direction may be about 120° to about 150°.

An angle between the first diagonal direction and the second diagonal direction may be about 60° to about 120°.

The length shrinkage in each of the first diagonal direction and the second diagonal direction may be about −0.15% to about +0.15%.

The optical film may be formed of at least one resin selected from among polyethylene terephthalate resins, polybutylene terephthalate resins, polyethylene naphthalate resins, and polybutylene naphthalate resins.

The polarizing plate may further comprise an optical film which has the shrinkage difference between a length shrinkage in a first diagonal direction and a length shrinkage in a second diagonal direction of about −0.05% to about +0.05% with respect to either the mechanical direction (MD) or the transverse direction (TD) of the optical film (as a reference direction).

According to another embodiment of the present invention, an optical display apparatus includes the polarizing plate.

BRIEF DESCRIPTION OF THE DRAWING

These and other features and advantages of embodiments of the present invention will be better understood by reference to the following detailed description when considered in conjunction with the accompanying drawings, in which.

DETAILED DESCRIPTION

Figure 1:
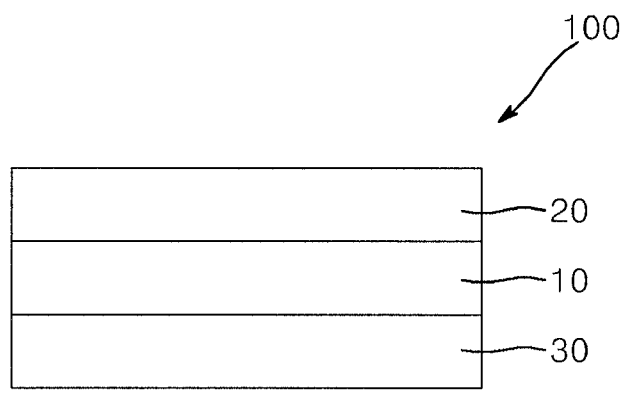
FIG. 1 is a cross-sectional view of a polarizing plate according to one embodiment of the present invention.

Hereinafter, embodiments of the present invention will be described in detail with reference to the accompanying drawings. It should be understood that the present invention may be embodied in different ways and is not limited to the following embodiments. In the drawings, elements irrelevant to the description of the invention will be omitted for clarity. Like components will be denoted by like reference numerals throughout the specification. As used herein, terms such as "upper side" and "lower side" are defined with reference to the accompanying drawings. Thus, it will be understood that the term "upper side" can be used interchangeably with the term "lower side".

Figure 5:
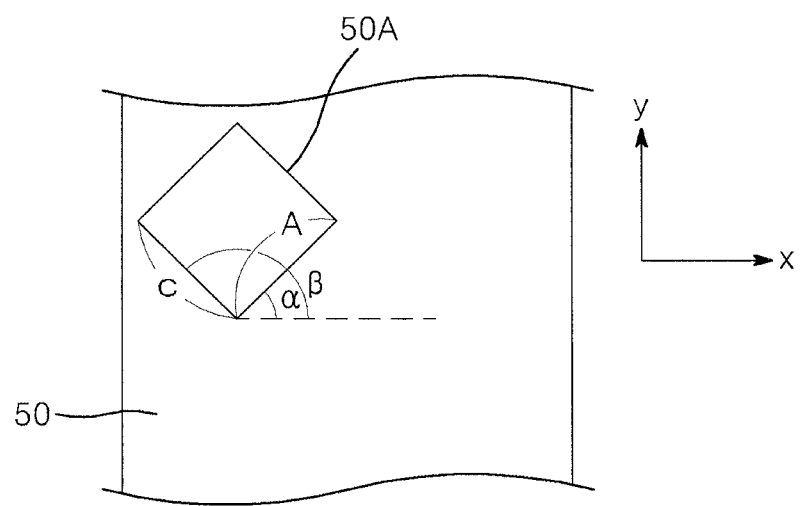
FIG. 5 is a conceptual drawing showing length shrinkage measurement in a polyester film according to an embodiment of the present invention.

As used herein, a shrinkage difference between a length shrinkage in a first diagonal direction and a length shrinkage in a second diagonal direction of a polyester film with respect to either the mechanical direction (MD) or the transverse direction (TD) of the polyester film (as a reference direction) can be measured as follows. Referring to FIG. 5, the x-axis direction represents a transverse direction (TD) of a film 50, and the y-axis direction represents a machine direction (MD) of the film 50 and the x-axis direction and the y-axis direction are orthogonal to each other. A film specimen 50A (having, for example, a tetragonal shape, such as a square shape or the like) is taken from the film 50. In the film specimen 50A, a first diagonal direction defines an angle α with respect to TD and has a length A. After the specimen 50A is allowed to stand at 85±5° C. for 30 minutes, a length B of the specimen of the film corresponding to the first diagonal direction is measured. Then, the length shrinkage in the first diagonal direction of the specimen is calculated by Equation 1:

Length shrinkage in the first diagonal direction(%)= $(A-B)/A \times 100$,  Equation 1

In equation 1, A is an initial length of a specimen of the polyester film corresponding to the first diagonal direction with respect to the reference direction, and B is a length of the specimen of the polyester film corresponding to the first diagonal direction after allowing the film specimen to stand at 85±5° C. for 30 minutes.

In addition, a second diagonal direction of the film specimen 50A defines an angle β with respect to TD and has a length C. After the film specimen 50A is allowed to stand at 85±5° C. for 30 minutes, a length D of the film specimen 50A corresponding to the second diagonal direction is measured. Then, length shrinkage in the second diagonal direction of the film specimen is calculated in accordance with Equation 2:

Length shrinkage in the second diagonal direction (%)= $(C-D)/C \times 100$,  Equation 2

In equation 2, C is an initial length of a specimen of the polyester film corresponding to the second diagonal direction with respect to the reference direction, and D is a length of the specimen of the polyester film corresponding to the second diagonal direction after allowing the film specimen to stand at 85±5° C. for 30 minutes.

Here, an angle between the first diagonal direction and second diagonal direction is not 0°. The shrinkage difference may be calculated a difference between the length shrinkage in the first diagonal direction and the length shrinkage in the second diagonal direction. Although the above description is made with reference to the transverse direction, it should be understood that the above description can also be applied to the mechanical direction.

Next, a polarizing plate according to one embodiment of the invention will be described with reference to FIG. 1. FIG. 1 is a cross-sectional view of a polarizing plate according to one embodiment.

Referring to FIG. 1, a polarizing plate 100 according to one embodiment comprises a polarizer 10, a first optical film 20 formed on a first side (e.g., an upper side) of the polarizer 10, and a second optical film 30 formed on a second side (e.g., a lower side) of the polarizer 10, wherein the first optical film 20 may be a polyester film having a shrinkage difference from about −0.1% to about +0.1%, for example about −0.1, −0.09, −0.08, −0.07, −0.06, −0.05, −0.04, −0.03, −0.02, −0.01, 0; +0.01, +0.02, +0.03, +0.04, +0.05, +0.06, +0.07, +0.08, +0.09 or +0.1%. When the shrinkage difference of the polyester film is less than −0.1% or greater than 0.1%, the polyester film can undergo shrinkage due to heat generated during manufacture or operation of the polarizing plate, so that an optical axis of the polarizer on the polyester film is distorted, thereby lowering a polarization degree of the polarizing plate.

Referring to FIG. 5, the angle α may be from about 30° to about 60°, for example about 45°, with respect to TD, and the angle β may be from about 120° to about 150°, for example about 135°, with respect to TD. An angle between the first diagonal direction and the second diagonal direction may be about 60° to about 120°.

The length shrinkage in each of the first diagonal direction and the second diagonal direction may be about −0.15% to about +0.15% for example about −0.15, −0.14, −0.13, −0.12, −0.11, −0.1, −0.1, −0.09, −0.08, −0.07, −0.06, −0.05, −0.04, −0.03, −0.02, −0.01, 0, +0.01, +0.02, +0.03, +0.04, +0.05, +0.06, +0.07, +0.08, +0.09, +0.1, +0.11, +0.12, +0.13, +0.14 or +0.15%. Within this range, a polarization degree of the polarizing plate may not be lowered, in spite of a distortion of an optical-axis of the polarizer The length shrinkage may be measured using a film specimen obtained at a certain location of a film. When the film is stretched film, force is mainly concentrated on a central portion of the film with respect to the transverse direction, so that the film is stretched mainly at the central portion in the transverse direction and the degree of stretching is gradually reduced towards both ends of the film with respect to the transverse direction. This affects a thermal shrinkage direction when the polarizing plate is shrunk by heat generated during manufacture or operation of the polarizing plate. Thus, length shrinkage is preferably measured at an end portion of the film with respect to the transverse direction of the film. Here, the end portion may refer to a section within 0 to 2.5% of one end of the film with respect to the transverse direction.

Figure 6:
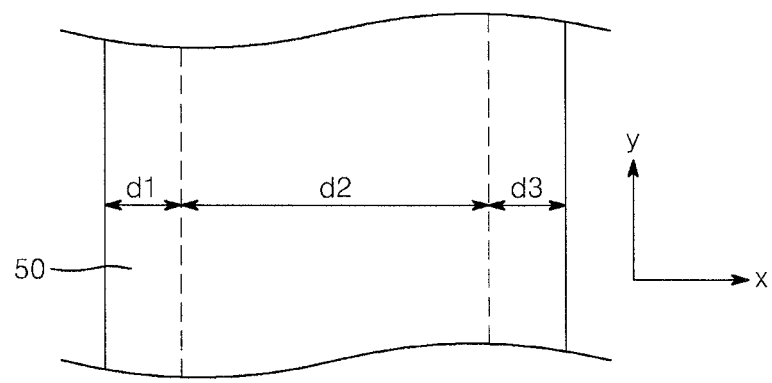
FIG. 6 shows a portion of the polyester film for which length shrinkage is measured.

Specifically, referring to FIG. 6, the x-axis direction represents the transverse direction (TD) of the film 50, and the y-axis direction represents the mechanical direction (MD) of the film 50 and the x-axis direction and the y-axis direction are orthogonal to each other. The film may be divided into d1, d2 and d3 with reference to TD, wherein d1 and d3 each correspond to sections within 0 to 2.5% from an end of the film. Length shrinkage may be measured using a specimen taken from section d1 or d3. More specifically, the length shrinkage may be measured on a specimen taken from a section greater than 0 and not more than 2.5%, for example, within about 0.001% to 2.5% from one end of the film with reference to TD.

The polyester film may be a film stretched at high elongation and may have an ultrahigh phase difference to prevent deterioration in image quality by suppressing generation of rainbow spots when used in a polarizing plate of an optical display. In one embodiment, the polyester film may have a thickness of about 25 μm to about 500 μm, specifically about 25 μm to about 115 μm, and an in-plane phase difference (Ro) from about 5,000 nm to about 15,000 nm, specifically from about 10,100 nm to about 12,000 nm, at a wavelength of 550 nm. Within this range, when used as a protective film of the polarizer, the polyester film can prevent generation of rainbow spots, lateral light leakage, and increase in difference in phase difference due to variation of the phase difference depending on an incident angle of light.

The polyester film may be a polyester film of which one of nx and ny is about 1.65 or more, when nx is a refractive index in x-axis direction of the polyester film at a wavelength of 550 nm and ny is a refractive index in y-axis direction of the polyester film at a wavelength of 550 nm. If both nx and ny are less than 1.65, or both nx and ny are 1.65 or more, the polyester film can cause rainbow spots due to birefringence when it may be a protective film for a polarizer. In one embodiment, nx may be about 1.65 or more, specifically about 1.67 to about 1.75 for example about 1.67, 1.68, 1.69, 1.70. 1.71, 1.72, 1.73, 1.74 or 1.75, ny may be about 1.45 to about 1.55 for example about 1.45, 1.46, 1.47, 1.48, 1.49, 1.50, 1.51, 1.52, 1.53, 1.54 or 1.55. In another embodiment, ny may be about 1.65 or more, specifically about 1.67 to about 1.72 for example about 1.67, 1.68, 1.69, 1.70, 1.71 or 1.72, more specifically about 1.69 to about 1.72, nx may be about 1.45 to about 1.55 for example about 1.45, 1.46, 1.47, 1.48, 1.49, 1.50, 1.51, 1.52, 1.53, 1.54 or 1.55. Absolute value of nx−ny(|nx−ny|) may be about 0.1 to about 0.2, for example about 0.1, 0.11, 0.12, 0.13, 0.14, 0.15, 0.16, 0.17, 0.18, 0.19 or 0.2, specifically about 0.12 to about 0.18. Within this range, the polyester film may improve viewing angle and suppress rainbow spots.

The polyester film may have a degree of biaxiality (NZ) of about 1.8 or less at a wavelength of 550 nm, for example, from about 1.0 to about 1.8, as represented by Equation 3. Within this range, the polyester film can suppress rainbow spots due to birefringence:

$$NZ=(nx-nz)/(nx-ny),\qquad \text{Equation 3}$$

In equation 3, nx, ny and nz are refractive indexes in x-, y- and z-axis directions of the polyester film at a wavelength of 550 nm, respectively.

The polyester film may have an out-of-plane retardation (Rth) of about 15,000 nm or less at a wavelength of 550 nm, for example, from about 10,000 nm to about 12,000 nm, as represented by Equation 4. Within this range, the polyester film can suppress rainbow spots due to birefringence.

$$Rth=((nx+ny)/2-nz)\times d,\qquad \text{Equation 4}$$

In equation 4, nx, ny and nz are refractive indexes in x-, y- and z-axis directions of the polyester film at a wavelength of 550 nm, respectively, and d is a thickness of the polyester film (unit: nm).

The polyester film may be a film stretched in the transverse direction without stretching in the machine direction, and may be a film stretched to a length of about 2 to about 10 times an initial length thereof in the transverse direction and to a length of about 1 to about 1.1 times an initial length thereof in the machine direction. Here, "to a length of about 1 to about 1.1 times an initial length thereof in the machine direction" means that additional stretching is not performed excluding stretching by a mechanical process (in the machine direction), and a stretching ratio of 1 means a non-stretched state of the film. Within this range, the polyester film can become an ultra-high retardation film and improve image quality by preventing generation of rainbow spots. In one embodiment, the polyester film may be subjected to stretching only in the transverse direction to have an absolute molecular orientation angle (θr) of polyester molecules of about 5° or less, for example, from about 0° to about 5°, with regard to the transverse direction of the polyester film. Within this range, the polyester film can act as an ultra-high retardation film to improve image quality by preventing generation of rainbow spots. The polyester film may be stretched at a high magnification in the transverse direction and may exhibit an asymmetrical molecular orientation angle with reference to the transverse direction. The molecular orientation angle may be measured using any typical equipment in the art, for example, KOBRA-21ADH2 (Oji Co., Ltd.) and AXOSCAN (Axometrics Co., Ltd).

As the polyester film, any transparent film of a polyester resin may be used without limitation. In one embodiment, the polyester film may be formed of at least one resin selected from among polyethylene terephthalate resins, polybutylene terephthalate resins, polyethylene naphthalate resins, and polybutylene naphthalate resins.

The polyester film may have a thickness of about 25 μm to about 500 μm. Within this range, the polyester film may be used as a protective film for polarizing plates.

The polyester film may be prepared by a method including stretching a melt-extruded polyester resin to a length of about 2 to about 10 times an initial length thereof only in the transverse direction. Within this range of the stretching ratio, the polyester film does not cause rainbow spots. Specifically, the polyester film may have a stretched ratio of about 3 to about 8 times an initial length thereof.

Stretching may be performed by at least one of dry stretching and wet stretching at a stretching temperature from $(Tg-20)°$ C. to $(Tg+50)°$ C. with reference to glass transition temperature Tg of the polyester resin, specifically from about 70° C. to about 150° C., more specifically from about 80° C. to about 130° C., more specifically about 90° C. to about 120° C. Within this range of stretching temperature, it is possible to achieve uniform stretching of the polyester film.

After stretching the polyester film, the method may further include tension-relaxation of reducing stretching of the polyester film in the transverse direction while heating the stretched polyester film in a predetermined temperature range. By tension-relaxation, the polyester film may be stretched in the transverse direction while achieving crystallization and stabilization of the polyester film through heat treatment, thereby achieving a shrinkage difference according to the present invention. Specifically, in the tension-relaxation, the polyester film may be heated in an oven at a glass transition temperature or more of the polyester resin, for example, at about 100° C. to about 300° C., for about 1 second to about 2 hours. Here, the polyester film may be stretched to a length of about 0 to about 3 times in the transverse direction, specifically a length of about 0.1 to about 2 times, more specifically to a length of about 0.1 to about 1 times.

The polarizer 10 aligns directions of light passing through an optical film and decomposes an incident beam into two polarizing components orthogonal to each other such that only one component is allowed to pass therethrough and the other component is absorbed or scattered. In the present invention, any polarizer typically used in manufacture of a polarizing plate may be used without limitation. The polarizer may be manufactured by dyeing a polyvinyl alcohol film with iodine or dichroic dyes, followed by stretching the dyed polyvinyl alcohol film in a certain direction. Specifically, the polarizer may be manufactured by swelling, dyeing, stretching, and cross-linking. Each process is typically known to those skilled in the art.

The polarizer 10 may have a thickness of, for example, about 20 μm to about 100 μm, without being limited thereto. Within this thickness range, the polarizer may be used in the polarizing plate.

The second optical film 30 may be a typical transparent optical film. For example, the second optical film may be formed of at least one of cellulose films such as triacetyl cellulose films and the like, polycarbonate films, acrylic films, and olefin films such as cycloolefin films, as well as polyester films.

The second optical film 30 may have a length shrinkage in the first diagonal direction from about −0.1% to about 0.1% and a length shrinkage in the second diagonal direction from about −0.1% to about 0.1%. The second optical film may have a shrinkage difference from about −0.05% to about 0.05% between the length shrinkage in the first diagonal direction and the length shrinkage in the second diagonal direction. Within this range, the polarizing plate does not suffer from warpage and distortion of an optical axis upon operation of the polarizing plate. The length shrinkage and shrinkage difference for the second optical film may be measured in the same way as the first optical film.

The second optical film 30 may have a thickness of about 25 μm to about 500 μm. Within this thickness range, the second optical film 30 can be used as a protective film for polarizing plates.

Although not shown in FIG. 1, the first optical film and second optical film may be subjected to surface treatment to impart additional functions. Surface treatment provides functionality to the optical films and includes, for example, anti-reflection treatment, anti-glare treatment, anti-glare/low-reflection treatment, hard coating treatment, and the like. In addition, although not shown in FIG. 1, the polarizing plate according to one embodiment of the invention may include a retardation compensation film, a retardation film, a bonding layer, and an adhesive layer depending on application thereof.

The polarizing plate may be manufactured by stacking the first optical film on the first side of the polarizer and stacking the second optical film on the second side of the polarizer. A method for stacking the optical films on the polarizer is not particularly limited and may be performed using any typical adhesives, for example, at least one of water-based adhesives and pressure sensitive adhesives.

Figure 2:
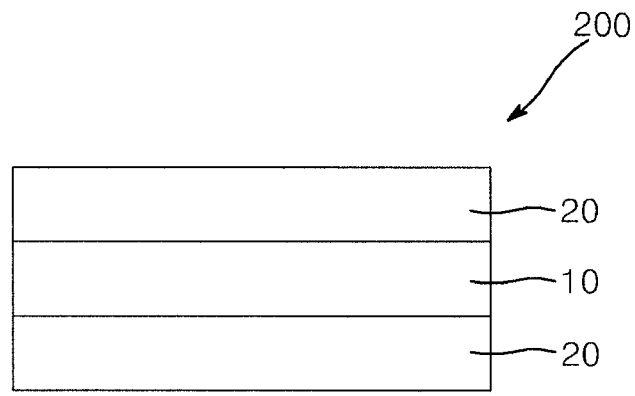
FIG. 2 is a cross-sectional view of a polarizing plate according to another embodiment of the present invention.

Next, a polarizing plate according to another embodiment will be described with reference to FIG. 2. FIG. 2 is a sectional view of a polarizing plate according to another embodiment of the present invention.

Referring to FIG. 2, a polarizing plate 200 according to this embodiment includes a polarizer 10, a first optical film 20 formed on a first side (e.g., an upper side) of the polarizer 10, and a first optical film 20 formed on a second side (e.g., a lower side) of the polarizer 10, wherein the first optical film 20 may be a polyester film having a shrinkage difference from about −0.1% to about +0.1%. The polarizing plate 200 according to this embodiment is substantially the same as the polarizing plate of the above embodiment except that the first optical film formed on the second side of the polarizer has a shrinkage difference from about −0.1% to about +0.1%.

Figure 3:
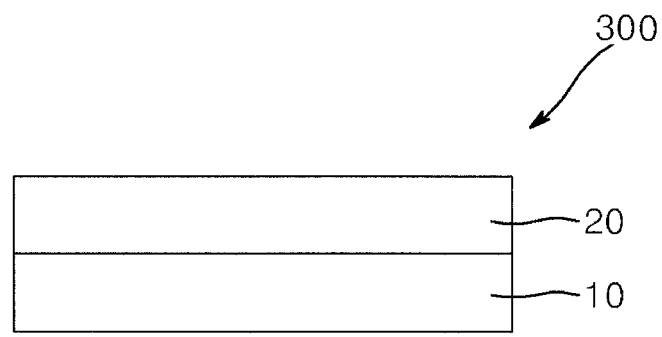
FIG. 3 is a cross-sectional view of a polarizing plate according to another embodiment of the present invention.

Next, a polarizing plate according to another embodiment of the invention will be described with reference to FIG. 3. FIG. 3 is a cross-sectional view of a polarizing plate according to another embodiment.

Referring to FIG. 3, a polarizing plate 300 according to another embodiment comprises a polarizer 10, and a first optical film 20 formed on a first side (e.g., an upper side) of the polarizer 10, wherein the first optical film 20 may be a polyester film having a shrinkage difference from about −0.1% to about +0.1%. When the shrinkage difference of the polyester film is less than −0.1% or greater than 0.1%, the polyester film can undergo shrinkage due to heat generated during manufacture or operation of the polarizing plate, so that an optical axis of the polarizer on the polyester film is distorted, thereby lowering a polarization degree of the polarizing plate.

Although not shown in FIG. 3, the polarizing plate 300 further may comprise a protective coating layer on a second side (e.g., a lower side) of the polarizer 10.

According to the present invention, an optical display apparatus may include the polarizing plate according to the embodiments of the invention. The optical display apparatus may include an organic light emitting diode display or a liquid crystal display, without being limited thereto.

Figure 4:
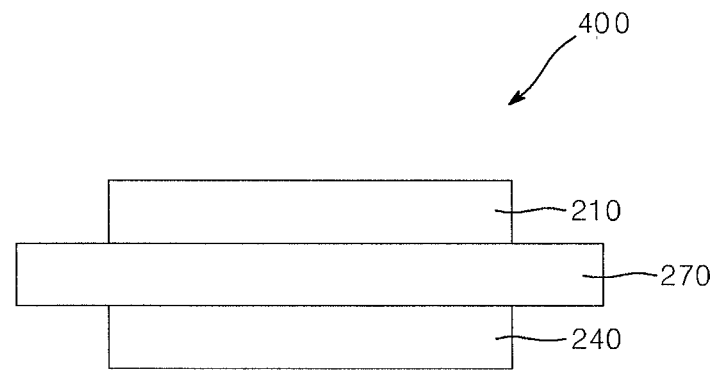
FIG. 4 is a cross-sectional view of an optical display apparatus according to one embodiment of the present invention.

FIG. 4 illustrates a cross-sectional view of a liquid crystal display according to one embodiment of the invention. Referring to FIG. 4, a liquid crystal display 400 may include a liquid crystal panel 270 and first and second polarizing plates 210, 240 formed on upper and lower sides of the liquid crystal panel 270, respectively, wherein at least one of the first and second polarizing plates 210, 240 may include the polarizing plate according to the embodiments of the present invention.

Embodiments of the present invention will now be described with reference to the following examples. It should be understood that these examples are provided for illustrative purposes only and are not to be in any way construed as limiting the invention.

The components used in the examples and comparative examples were as follows:

(A) Polarizer: Polyvinyl alcohol film (VF-PS6000, Kuraray Co., Ltd., thickness: 60 μm)

(B) Protective film: A polyethylene terephthalate (PET) film and a triacetyl cellulose (TAC) film, which have length shrinkages in the first diagonal direction (45° diagonal direction with respect to TD of the film) and the second diagonal direction (135° diagonal direction with respect to TD of the film) as listed in Table 1, were used.

Optical film 1 was prepared by melt-extruding a polyethylene terephthalate resin and stretching the melt-extruded film to a length of 6.1 times an initial length thereof only in TD without stretching in MD, followed by tension-relaxation treatment under conditions as listed in Table 1. Optical films 2 to 5 were prepared in the same manner except for the conditions of tension-relaxation as listed in Table 1. Optical film 6 was a triacetyl cellulose film KC4DR-1 (thickness: 40 μm, Konica Co. Ltd.), the length shrinkage in the first diagonal direction and the length shrinkage in the second diagonal direction was 0.1%, respectively.

The length shrinkages were measured on specimens which were taken from end portions of a 100 μm thick film (within 2.5% from one end of the film with respect to TD of the film) and had a square shape (100 mm×100 mm, length×width), each side of which has a length of 100 mm, according to Equations 1 and 2, and the shrinkage difference between the length shrinkages was calculated therefrom. nx, ny, and Ro at a wavelength 550 nm were measured using Axoscan (Axometrixs).

outside the −0.1% to 0.1% range, exhibited a low degree of polarization, and thus could not achieve the effects of embodiments of the present invention.

Although some exemplary embodiments of the present invention have been disclosed herein, it will be understood

TABLE 1

| | Film material | Tension-Relaxation Treatment | Temp. (° C.) | Length shrinkage (%) in first diagonal direction | Length shrinkage (%) in second diagonal direction | Difference in length shrinkage (%) | nx | ny | thickness (μm) | Ro (nm) |
|---|---|---|---|---|---|---|---|---|---|---|
| Optical film 1 | PET | ○ | 250 | 0.05 | 0.05 | 0 | 1.69 | 1.56 | 80 | 10,100 |
| Optical film 2 | PET | ○ | 150 | 0.05 | 0.10 | 0.05 | 1.69 | 1.56 | 80 | 10,100 |
| Optical film 3 | PET | ○ | 100 | 0.05 | 0.15 | 0.10 | 1.69 | 1.56 | 80 | 10,100 |
| Optical film 4 | PET | ○ | 200 | 0.15 | 0.15 | 0 | 1.69 | 1.56 | 80 | 10,100 |
| Optical film 5 | PET | X | — | 0.05 | 0.20 | 0.15 | 1.69 | 1.56 | 80 | 10,100 |

EXAMPLES 1-4 AND COMPARATIVE EXAMPLE 1

Polarizers were prepared by dyeing, stretching, or the like. Specifically, a polyvinyl alcohol film was stretched twice at 150° C. followed by iodine adsorption, and then stretched 2.5 times in an aqueous solution of boric acid at 40° C. to prepare a polarizer. Protective films having the upper and lower films as shown in Table 2 were stacked using an acrylic adhesive on the upper and lower sides of the polarizer to prepare a polarizing plate.

The polarizing plate was measured for r axis scattering (representing optical axis distortion). The r axis scattering was calculated by the method for measuring a distorted value of the pol axis based on the fast axis of the polarizer using an AxoScan device (Traverse System). Polarization of each polarizing plate was measured using a V-7100 (JASCO Co., Ltd., Japan).

TABLE 2

| | Protective film | | R axis scattering (°) | Polarization (%) |
|---|---|---|---|---|
| | Upper | Lower | | |
| Example 1 | Optical film 1 | Optical film 6 | 0.20 ± 0.10 | 99.997 |
| Example 2 | Optical film 2 | Optical film 6 | 0.54 ± 0.12 | 99.995 |
| Example 3 | Optical film 3 | Optical film 6 | 0.62 ± 0.10 | 99.988 |
| Example 4 | Optical film 4 | Optical film 6 | 0.30 ± 0.10 | 99.996 |
| Comparative Example 1 | Optical film 5 | Optical film 6 | 0.76 ± 0.11 | 99.979 |

As shown in Table 2, the polarizing plates according to embodiments of the present invention had polyester film with shrinkage differences of −0.1% to 0.1%, and had r-axis scattering of about 0.5° even when the polarizing plates were attached to a polarizer, and thereby effectively suppressed distortion of the optic axis. Therefore, the present invention provides a polarizing plate which includes a polyester film as a protective film and can prevent distortion of an optical axis upon manufacture or operation of the polarizing plate. Further, the present invention provides a polarizing plate which includes a polyester film as a protective film and has a high degree of polarization.

On the contrary, the polarizing plate of Comparative Example 1, in which the PET film had a shrinkage difference by those of ordinary skill in the art that various modifications, changes, and alterations can be made to the described embodiments without departing from the spirit and scope of the invention. Therefore, the scope of the present invention should be limited only by the accompanying claims and equivalents thereof.

What is claimed is:

1. A polarizing plate comprising:
a polarizer;
at least one optical film on at least one side of the polarizer; and
wherein the optical film comprises a polyester film stretched in a transverse direction (TD) and not stretched in the mechanical direction (MD),
the polyester film having an in-plane phase difference (Ro) of about 5,000 nm to about 15,000 nm at a wavelength of 550 nm,
the polyester film has a shrinkage difference between length shrinkage in a first diagonal direction and length shrinkage in a second diagonal direction of about −0.1% to about +0.1% with respect to a reference direction, the reference direction being either the mechanical direction (MD) or the transverse direction (TD) of the polyester film,
the length shrinkage in the first diagonal direction being represented by Equation 1:

Length shrinkage in the first diagonal direction (%)= $(A-B)/A \times 100$     Equation 1 wherein, in Equation 1, A is an initial length of a specimen of the polyester film corresponding to the first diagonal direction with respect to the reference direction, and B is a length of the specimen of the polyester film corresponding to the first diagonal direction after allowing the specimen to stand at 85±5° C. for 30 minutes,
the length shrinkage in the second diagonal direction being represented by Equation 2:

Length shrinkage in the second diagonal direction (%)=$(C-D)/C \times 100$     Equation 2 wherein in Equation 2, C is an initial length of a specimen of the polyester film corresponding to the second diagonal direction with respect to the reference direction, and D is a length of the specimen of the polyester film corresponding to the second diagonal direction after allowing the specimen to stand at 85±5° C. for 30 minutes, an angle between the first diagonal direction and the second diagonal direction is about 60° to about 120°, the polyester film is a polyethylene terephthalate film, the polyester film consists of a single layer film and has a thickness of about 25 μm to about 500 μm, and the polyester film has a refractive index, nx, in an x-axis direction of the polyester film, and a refractive index, ny, in a y-axis direction of the polyester film, one of nx and ny being 1.65 or greater, and the other of nx and ny being less than 1.65, the polyester film having an out-of-plane retardation (Rth) of about 12,000 nm or less at a wavelength of 550 nm, as represented by Equation 4:

$$Rth=((nx+ny)/2-nz) \times d,\qquad \text{Equation 4}$$

wherein, nx and ny are the refractive indexes in the x-axis and y-axis directions, respectively, of the polyester film, nz is a refractive index in a z-axis direction of the polyester film at a wavelength of 550 nm, and d is a thickness of the polyester film in nm, wherein the polarizing plate having the at least one optical film on the at least one side of the polarizer has R axis scattering as a measure of optical axis distortion of about 0.1° to about 0.5°.

2. The polarizing plate according to claim 1, wherein an angle between the first diagonal direction and the reference direction is about 30° to about 60°, and an angle between the second diagonal direction and the reference direction is about 120° to about 150°.

3. The polarizing plate according to claim 1, wherein the length shrinkage in each of the first diagonal direction and the second diagonal direction is about −0.15% to about +0.15%.

4. The polarizing plate according to claim 1, wherein the polarizing plate further comprises a second optical film which has a shrinkage difference between length shrinkage in a first diagonal direction of the second optical film and length shrinkage in a second diagonal direction of the second optical film of −0.05% to +0.05% with respect to a reference direction of the second optical film, the reference direction being either the mechanical direction (MD) or the transverse direction (TD) of the second optical film.

5. An optical display apparatus comprising:
the polarizing plate according to claim 1.

* * * * *